United States Patent [19]

Ruffin

[11] Patent Number: 4,606,020

[45] Date of Patent: Aug. 12, 1986

[54] EFFICIENT DESIGN TECHNIQUE FOR WAVELENGTH DIVISION MULTIPLEXING

[75] Inventor: Paul B. Ruffin, Huntsville, Ala.

[73] Assignee: The United States of America as represented by the Secretary of the Army, Washington, D.C.

[21] Appl. No.: 576,976

[22] Filed: Feb. 3, 1984

[51] Int. Cl.⁴ .............................................. H04B 9/00
[52] U.S. Cl. ..................... 370/3; 350/96.15; 350/96.2
[58] Field of Search ................ 370/1, 3; 350/96.15, 350/96.16, 96.22, 96.2

[56] References Cited

U.S. PATENT DOCUMENTS 4,027,945  6/1977  Iverson .............................. 350/96.12
4,240,694  12/1980  Pan .................................. 350/96.15
4,305,641  12/1981  Witte ................................ 350/96.15
4,360,248  11/1982  Bickel et al. ....................... 350/96.15

Primary Examiner—Joseph A. Orsino, Jr.
Attorney, Agent, or Firm—Anthony T. Lane; Robert P. Gibson; Robert C. Sims

[57] ABSTRACT

More than ten different wavelength channels are multiplexed over a single optical fiber for use in optical slip ring assemblies. The ends of multimode fibers, through which light signals of different wavelengths are transmitted, are packaged and fused to the end of a large core fiber. The single large core fiber in which the combined signals are transmitted can be used in an optical slip ring assembly in the same way as a single fiber containing one wavelength. The alignment accuracy is greatly enhanced for the large core fiber.

1 Claim, 5 Drawing Figures

EFFICIENT DESIGN TECHNIQUE FOR WAVELENGTH DIVISION MULTIPLEXING

DEDICATORY CLAUSE

The invention described herein may be manufactured, used, and licensed by or for the Government for govermental purposes without the payment to me of any royalties thereon.

BACKGROUND OF THE INVENTION

1. Field of the Invention

This invention pertains to a technique for multiplexing several different wavelength signals in Optical Slip Ring Assemblies. More distinctively, this invention pertains to an efficient optical power combiner technique for multiplexing several signals of different wavelengths to a single optical fiber.

2. Description of the Prior Art

Electrical signals are multiplexed together to form a large-bandwidth composite signal which modulates a light source. This method of multiplexing necessitates sophisticated electronic circuitry. Space division multiplexing which does not attempt to utilize the bandwidth capability of the fiber. Time division multiplexing send several signals over a common fiber by sampling each signal at a precise rate. This multiplexing scheme imposes severe requirements for linearity and high output power on the optical source. Wavelength division methods of multiplexing, currently in use or under research, employ techniques for sending several signals over a common fiber via its own wavelength. The primary components utilized for these methods are prism, mirrors, filters, lenses and gratings. The cost, size and reproducibility of these components are directly proportional to the performance.

Many different types of wavelength division multiplexing techniques have been proposed to multiplex several different wavelengths signals. Generally, the number of signals which can be multiplexed is limited to two or three different signals. The use of a bifurcated fiber optic bundles for both the rotating bundle and the non-rotating bundle in an optical slip ring asssemly was suggested in U.S. Pat. Nos. 4,027,945; 4,109,997 and 4,109,998. A bifurcated fiber can multiplex only two different wavelength signals. Several bifurcated fibers can be used to form a bundle which will require the technique of this invention (or a similar technique) to multiplex the set of dual wavelength signals to a single transmission line.

Another method for transferring light signals from a rotating body to a non-rotating body in an optical slip ring assembly is also represented by U.S. Pat. No. 4,027,945. Light carrying members may be bundles of fiber optics which are placed end to end coaxially with the axis of rotation. Multichannel bundles may be used where the channels at the coupled ends are each formed into concentric circles separated by opaque material. Although such methods have served the purpose, they have not proven to be entirely sufficient for a number of applications because of the limitation on the number of signals to be multiplexed; a problem which is overcome by the present invention.

Symmetric couplers (multiplexers) have been used to combine light signals in different fibers to a single trunk fiber of the same size. The overall cumulative insertion loss would drastically increase when several sources are multiplexed using this type system. An optical power combiner, fabricated by wrapping two smaller fibers around a central large trunk fiber, can multiplex three sources to a single trunk with an insertion loss between any of the three input fibers and the trunk of approximately 1 dB. As the number of smaller fibers increase the fabrication process becomes more difficult and the inertion-loss in each small fiber increases.

The new multiplexing dual wavelength LEDs and demultiplexing photodetectors are directed toward simpler wavelength division multiplexing systems. The source emits two wavelengths bands (modulated independently) from a single source. The demultiplexing detector can detect and separate signals from the two wavelength bands simultaneously. Multiple wavelength devices for multiplexing more than two wavelength signals are yet in the developmental stages.

In many different gimbal and rotating systems it is desirable that many different signals be carried at different wavelengths so that a single optical transmission line may be employed to multiplex a plurality of signals. There is therefore a need for a multiplexing technique for optical slip rings in which the number of signals to be multiplexed is significantly increased beyond the number known in the prior art. A technique is provided in the present invention for increasing the number of signals to be multiplexed without the use of bulk optics. The alignment accuracy, which is critical because of the small dimensions of single fibers, is greatly enhanced in the present invention. The large core fiber containing the combined signals can be used in an optical slip ring assembly in the same way as a single fiber containing one wavelength is used.

SUMMARY OF THE INVENTION

The optical multiplexer of this invention comprises a large core (single trunk) optical fiber and several smaller and identical fibers emanating from sources of different wavelengths. The ends of the fibers which transmit light signals of different wavelength are packaged into a short tubing or guide (~/cm) to form a compact bundle. The fibers are accurately aligned and bonded in the sheath to permit mass splicing compatible with single-fiber splicing. The end of the fiber bundle is properly prepared and fused to the end of a single fiber of comparable size using an automatic splicing machine employing electric arc fusion. The different wavelength signals are coupled from a plurality of fibers to a single channel which permits simultaneous transmission of all the signals. The number of signals which can be multiplexed using the technique of this invention is directly proportional to the ratio of the size of the large core fiber to the size of one of the small core fibers.

An object of the optical multiplexing technique of this invention is to minimize the electronics and various optical components to make possible a compact structure. Another object of this multiplexing technique is the reduction in complexity. The present invention has direct application for optical slip rings in small sensors and devices.

DESCRIPTION OF THE PREFERRED EMBODIMENTS

Figure 1:
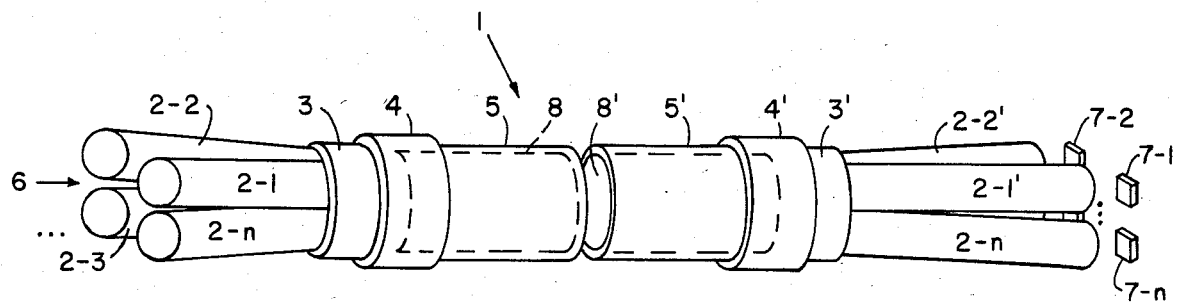
FIG. 1 shows an embodiment of the wavelength division technique of the present invention.
Figure 2A:
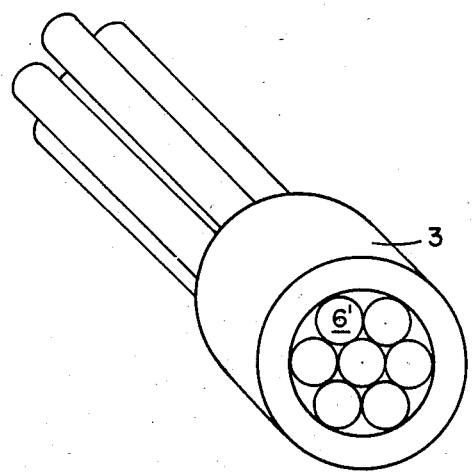
FIGS. 2A and 2B show detailed illustrations of the fiber bundle and the single large core fiber which are spliced to form the design of the present invention.

The wavelength division multiplexing technique of this invention provides a means for combining several signals of various wavelengths in a single core fiber with minimal power loss. Shown in FIGS. 1 and 2 is a wavelength division multiplexing design 1. This device efficiently uses the wide bandwidth of optical fibers 6 to simultaneously carry the signals from several sensors, not shown, over a plurality of fibers 6. The wavelength division multiplexing design 1 comprises a large single core fiber 8 and several small core fibers 2-1 . . . 2-n. The ends 6' of the small core fibers 2-1 . . . 2-n are packaged into a sheath 3 and fused to the end 8 of the single trunk fiber 5, using an automatic splicing machine employing electric arc fusion. The sheath 3 is index-matched with the cladding of the fibers used in this device. A casing 4 may may surround the splice to support the bond in a hostile environment.

A duplicate of the left side of FIG. 1 is supplied with cores 8 and 8' aligned so as to transfer electromagnetic energy between them. Therefore one side can be rotating while the other side is stationary (or both sides rotating at different speeds) and the energy will still be transferred as in a slip ring, but without direct contact.

In operation, light signals of different wavelengths are launched into the fiber ends 6 from different sources, not shown. The wavelength division multiplexing design 1 permits the optical energy of each light signal to be distributed throughout the large single trunk fiber 8 in many propagation modes (both high order and low order modes).

The multiplexing design 1 may also be used as a demultiplexer provided the intermingled wavelength signals in the small fibers 2-1' . . . 2-n' are filtered using optical filters 7-1 . . . 7-n. The light signals propagating through the large core single trunk fiber 8/8' are launched into each of the small fibers 2-1' . . . 2-n' and filtered by filters 7-1 through 7-n to pass only the desired output at each branch to the detector (not shown).

Figure 3A:
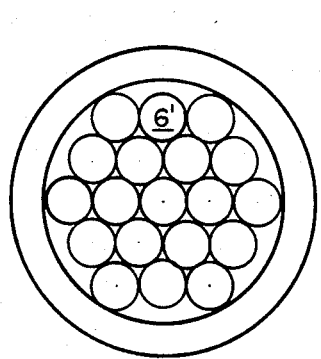
FIGS. 3A and 3B show the end views of two fiber bundles to be spliced to the end of a large core single trunk fiber.
Figure 3B:
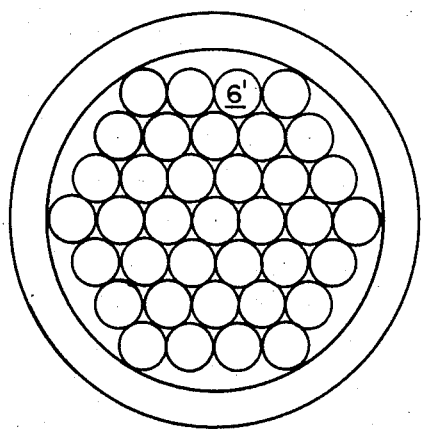

FIGS. 3A and 3B show the end views of two fiber bundles to be spliced to a large core single trunk fiber 5. The maximum number of wavelength channels allowable in the design of this invention are limited by the size of the large core fiber 8. FIG. 3A shows that the diameter (D) of the large core fiber must be five times the diameter (d) of one of the 19 small fibers. FIG. 3B shows that the diameter (D) of the large core fiber must be seven times the diameter (d) of one of the 37 small fibers. The number of propagation modes increases as the fiber core size increase.

Figure 2B:
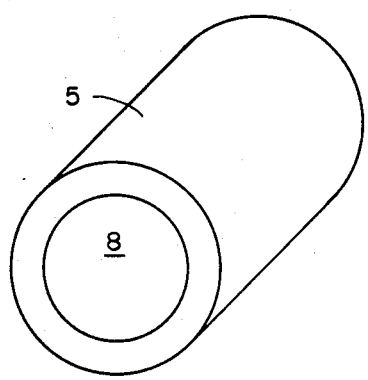

The invention of FIG. 1 could be a non-slip ring multiplexer when a single trunk fiber 8 as shown in FIG. 2B is used instead of two spaced trunk fibers. Of course there will be no relative rotation of the two ends. The use of a single trunk fiber to transfer the signals to just short of the demultiplexers can be advantageous in both cost and reduction in signal loss.

The wavelength division multiplexing design of this invention is applicable to small sensors, as the multifunction sensor which use thin film transistor transducers, and compact devices. This device has a direct application for optical slip rings to permit light signals of different wavelengths to be transferred from a rotating body to a non-rotating body without any physical contact. The number of signals that can be multiplexed according to this invention well exceeds the conventional number. The reduction in the number of optical components and the efficiency of the present design enhances the reliability. The size and weight of this design is considerably reduced from that of the conventional designs. The production of this design provides a low cost optical multiplexer that may offer many performance benefits.

The multiplexing technique in this disclosure permits simultaneous transmission of the different wavelength signals in a single fiber. The bandwidth capability which is inherent in optical fibers is utilized to capacity in this wavelength division multiplexing technique. The single large core fiber in which the combined signals are transmitted can be used in a optical slip ring assembly in the same way as a single fiber containing one wavelength. The required alignment accuracy is greatly enhanced for the large core fiber. This technique for wavelength division multiplexing is also applicable to wavelength division demultiplexing wherein optical filters must be utilized. The multiplexing technique presented in this disclosure can be utilized in Air Bearing Multi-sensors, Gimbal Systems, Rate Tables, Test Equipment, Inertial Measurement Units, Radar and Infrared Acquisition Systems, and filament or fiber winders that twist the material as it is being wound.

I claim:

1. A multiplexer comprising a first set of a plurality of electromagnetic energy carrying members each transmitting electromagnetic signals of different wavelengths; one end of each of the members being packaged to form a bundle; each member carries a signal of a different wavelength; a larger electromagnetic energy carrying member being lined up and joined to said bundle so as to couple all of the electromagnetic signals into said larger member for multiplexing the signals; a second set of a plurality of electromagnetic carrying members equal in number to said first set of members; said second set of members being joined to an opposite end of said larger member for coupling said electromagnetic signals; said larger member is cut into first and second parts and is aligned spatially to transfer said signals; the first part of said larger member being joined to the first set of members being rotated relative to second part of said larger member; a plurality of demultiplexers individually connected to said second set of electromagnetic carrying members; the larger member is comparable in size to the size of said bundle; said electromagnetic carrying members are optical fibers; said fibers being joined in bundles and being spliced by an automatic splicing machine employing electric arc fusion; and a casing surrounding where the bundles are spliced for maintaining the efficiency of the bond.

* * * * *